United States Patent [19]
Gitlin et al.

[11] Patent Number: 5,995,827
[45] Date of Patent: Nov. 30, 1999

[54] METHOD OF MUTING A NON-SPEAKING CELLULAR TELEPHONE CALLER PARTICIPATING IN A CONFERENCE CALL

[75] Inventors: Richard Dennis Gitlin, Little Silver; Sanjay Kasturia; Sayandev Mukherjee, both of Middletown, all of N.J.

[73] Assignee: Lucent Technologies Inc., Murray Hill, N.J.

[21] Appl. No.: 08/974,951

[22] Filed: Nov. 20, 1997

[51] Int. Cl.$^6$ ........................................................ H04Q 7/20
[52] U.S. Cl. ............................ 455/416; 455/518; 455/212; 455/570; 379/202; 370/260
[58] Field of Search ................................ 455/90, 212, 218, 455/403, 414, 416, 417, 422, 426, 435, 463, 466, 517, 518, 569, 570, 575; 379/201, 202, 203, 204, 205, 206, 170; 370/259, 260, 261, 522

[56] References Cited

U.S. PATENT DOCUMENTS

| 4,430,742 | 2/1984 | Milleker et al. | 455/518 |
| 5,133,002 | 7/1992 | Kikuchi et al. | 455/416 |
| 5,191,593 | 3/1993 | McDonald et al. | 455/416 |
| 5,575,002 | 11/1996 | Mulford | 455/212 |
| 5,684,806 | 11/1997 | Akiyama et al. | 370/522 |
| 5,809,018 | 9/1998 | Lehmusto | 370/261 |
| 5,870,397 | 2/1999 | Chauffour et al. | 370/528 |
| 5,881,156 | 3/1999 | Treni et al. | 379/202 |
| 5,889,844 | 3/1999 | Kim et al. | 379/202 |
| 5,912,958 | 6/1999 | Eyran et al. | 379/170 |

Primary Examiner—Dwayne D. Bost
Assistant Examiner—Nay Maung

[57] ABSTRACT

A facility is provided in wireless communications system which causes a base station to substitute predetermined signals for speech and/or noise signals that are received from a wireless station that has entered a muting request, in which the predetermined signals, may be, for example, silence.

12 Claims, 3 Drawing Sheets

METHOD OF MUTING A NON-SPEAKING CELLULAR TELEPHONE CALLER PARTICIPATING IN A CONFERENCE CALL

FIELD OF THE INVENTION

The invention relates to a muting feature for a wireless telephone station set and the like.

BACKGROUND OF THE INVENTION

Hands-free (speakerphone) telephone stations are widely used in conference calls. Disadvantageously, if such telephone stations do not employ sophisticated noise cancellation techniques, then the background noise that is "picked up" at a hands-free station that is being used to monitor a conference call will, nevertheless, be transmitted to the other participants (conferees). Such background noise could be very annoying to the other participants. For this and other reasons, a hands-free telephone station is typically equipped with a so-called muting button that "mutes" all voice (including background noise) transmissions whenever the muting button is operated. Thus, a conferee who has operated the muting button on his/her hand-free station set may listen to the other participants in a conference call without being heard by them. (It is apparent that the foregoing also applies to a conventional wireless (cellular) station set.)

The values of respective voice/signal samples generated by a cellular/wireless station set are set to zero whenever a user of a hands-free wireless station operates the muting button during a telephone call. The setting of the voice signals to zero signifies the absence of a voice, which means that voice messages from the wireless mobile station set to a base station ceases during the time that the mute feature/function is set.

As is well-known, the wireless link over which voice messages are transmitted from a wireless station to a base station is very susceptible to (a) distortion due to shadowing, (b) fading effects due to multipath transmission, (c) the motion of wireless station, and (c) channel noise. The messages that are received at a base station via a noisy channel will then most likely contain an appreciable number of errors, many of which are not correctable. Consequently, such errors distort the signals that the base station outputs for that channel, and such signals are transmitted to a receiver as intrusive noise. In fact, the level of such noise could become very annoying to the listener. If the wireless station is participating in a conference connection, then it is likely that because of such noise, the other conferees may insist that the wireless participant disconnect from the conference connection.

SUMMARY OF THE INVENTION

We deal with the foregoing problem and advance the relevant art, in accordance with an aspect of the invention, by muting the wireless station at the base station. Specifically, when a user operates a mute button on a wireless station, then, in accordance with an aspect of the invention, the wireless station correspondingly notifies the base station. The base station then substitutes a predetermined signal, e.g., a signal characterizing silence, for the signals that it receives during the channel/time slot assigned to the muted wireless station. In accordance with another aspect of the invention, the predetermined signal may correspond to low-level background noise.

DETAILED DESCRIPTION

The invention will be discussed in the context of the Digital PCS North American TDMA (IS-136) standard, which is disclosed in the Telecommunication Industry Association publication TR45.3,IS-136.2 available from Global Engineering Documents, 15 Inverness Way East, Englewood, Colo. 80112, and which is incorporated herein by reference. However, that should not be construed as a limitation of the invention, since it will be appreciated from the following description and accompanying drawing that the invention may be practiced with so-called cordless telephone station sets as well as other such standards, for example, the well-known IS-54 standard, CDMA standard and European GSM standard governing wireless station sets.

Figure 1:
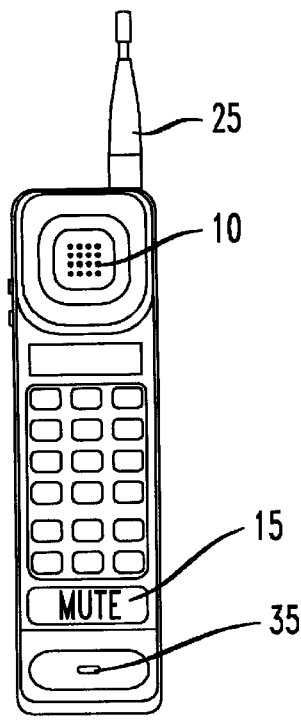
FIG. 1 is an illustrative example of a wireless station set in which the principles of the invention may be practiced.

A broad block diagram of a digital wireless station set comprising, inter alia, microphone 10 for receiving speech, speaker 35 for outputting speech and muting button 15 is shown in FIG. 1. The station set also comprises a transmitter section, FIG. 2, which processes and transmits speech received via microphone 10 and transmits the processed result over antenna 25, and which, in accordance with an aspect of the invention, notifies a base station (FIG. 4) whenever muting button 15 has been operated. Specifically, the transmitter section includes, inter alia, conventional low-pass filter 20 which filters the signals coupled to microphone 10 to exclude background noise by limiting the range of the signals supplied to analog-to-digital converter 30 to below, for example, 4 kHz. A/D converter 30, in turn, outputs to path 31 extending to speech encoder 40 digital versions of the analog signals that it receives at its input. Speech encoder 40 is a conventional Algebraic Code Excited Linear Predictive (ACELP) speech encoder) which compresses a large number of digital samples of speech signals that it receives at its input at a uniform sample rate, e.g., samples received at a rate of 104 kbps, to a lower amount, e.g., 7.4 kbps, and supplies the compressed result as well as various parameters relating to the compressed speech to channel coder (and transmitter) 50, which then processes the compressed result to include certain error protection. Channel coder 50 then transmits the final result over a wireless link via transmitter 25. (The specifications for encoder 40 and channel coder 50 are set forth in the aforementioned IS-136 standard.)

Figure 2:
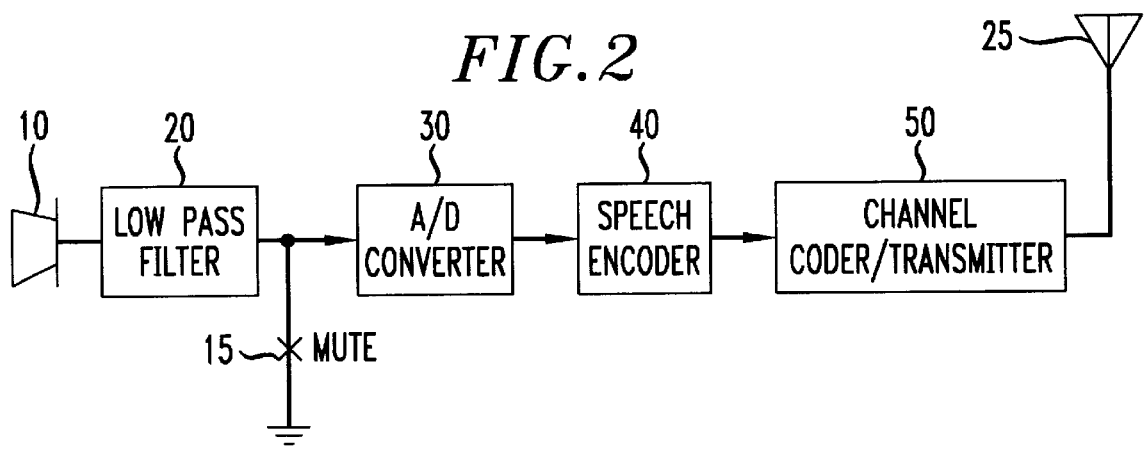
FIG. 2 is a broad block diagram of a transmitter section of the wireless station set of FIG. 1.

It is seen from FIG. 2 that when mute button 15 is in an active state then the input to A/D converter 30 is clamped to a known voltage level, e.g., zero volts (ground). Converter 30 continuously samples that voltage level as long as button 15 is active, and outputs to encoder 40 digital samples corresponding to that voltage level. Voice signals "picked up" by microphone 10 are thus prevented in this manner from being transmitted over the wireless link via antenna 25.

Figure 3:
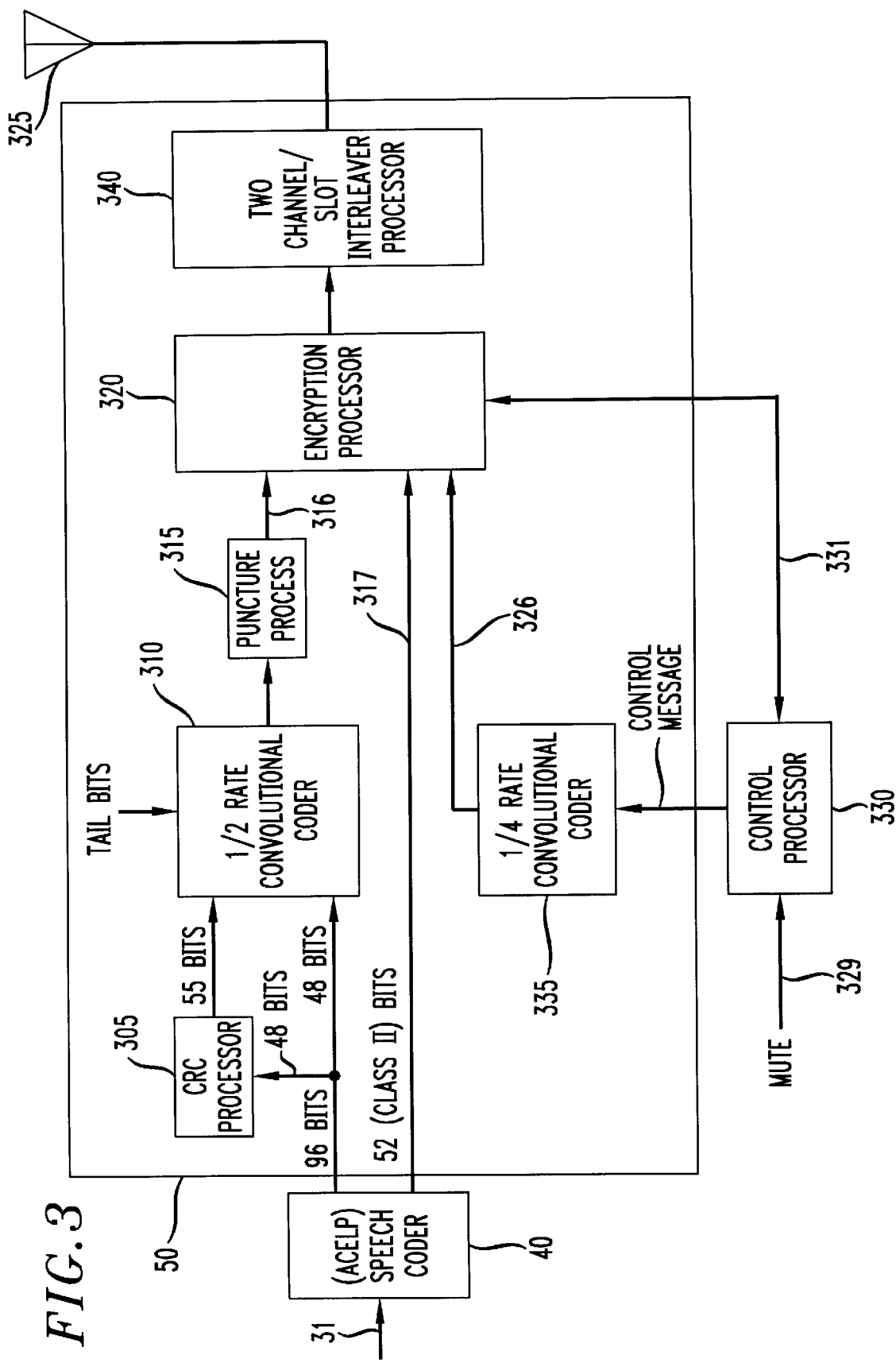
FIG. 3 is a broad block diagram of one example of a channel coder-transmitter that may be used in the station set of FIG. 2.

A more detailed diagram of channel coder 50 is shown in FIG. 3. Specifically, in accordance with the aforementioned standard, speech coder 40 forms a frame of 160 digital speech signals into a first group of 96 so-called class 1 bits and a second group of 52 class two bits. The 48 most significant class 1 bits are supplied to convention Cyclic Redundancy Code (CRC) processor 305 and the remaining 48 least significant class 1 bits are supplied to a first input of ½ rate convolutional coder 310. CRC processor 305 generates a seven bit CRC code over the 48 bits that it receives and supplies the code and 48 bits to a second input of ½ convolutional coder 310. Coder 310 employs two generator polynomials specified in the aforementioned IS-136 standard to expand the 108 bits that it receives via its two inputs to 216 bits. Coder 310 then supplies the expanded result to puncture (punctuation) processor 315. Processor 315 removes eight so-called bit indices (e.g., cc(52), cc(53), cc(106), cc(107), cc(160), cc (161), cc(214) and cc(215) to form a bit stream of 208 bits.

The 52 class II bits and 208 bits from puncture processor 315 are supplied to encryption processor 320, which encrypts the bit streams using a predetermined encryption vector. The encrypted result is then supplied to a two channel, slot interleaver processor 340. Processor 340, in a conventional manner, transmits the encrypted bit stream over two pre-assigned slots/channels of a time division frame of time slots/channels via antenna 25. That is, an interleaved frame comprises 130 of the even positioned bits of a current frame and 130 of the odd positioned bits of a succeeding speech frame.

Alternatively, encryption processor 320 receives via input 326 a third bit stream forming a control message originated by control processor 340. The path from control processor 330 to input 326 includes 1:4 convolutional coder 335 which expands a 65 bit control message to a 260 bit message so that the signal stream received via the third input 326 is contains the same number of bits as the bit stream that processor 320 receives via its other two inputs. In either case, processor 320 accepts, processes and outputs the latter it stream or the former bit stream, but not both.

The control messages are the means by which the wireless station communicates with the base station (or receiver) and such communications include, in accordance with an aspect of the invention, a message which advises the base station that the wireless station has been placed in a mute state. Processor 330 supplies a control message to processor 320 via path 331 that causes processor 320 to ignore a voice message it may be receiving via paths 316 and 317. That is, control processor 330 communicates with encryption processor 320 via path 331 for the purpose of determining, for example, if processor 320 is receiving a voice message via paths 316 and 317. If so, then processor 330 may return a control message to processor 320 directing the latter processor to ignore the voice message. Encryption processor 320, in response thereto, accepts the bit stream via path 326 and processes the bit stream in a conventional manner for transmission via processor 340.

Thus, when the station set is placed in a mute state as a result of a user operating the associated mute button, then, control processor 330 is notified of that fact via lead 329. Control processor 330, in response to such notification, generates a control message characterizing that state for transmission to the base station. Also, control processor 330 inserts a specially coded word in the message so that the base station may easily distinguish a control message from a speech message. Control processor 330 then sends a query to processor 320 via path 331 to determine if the control message can be forwarded to the latter processor. When control processor 330 is so advised via a return message from processor 320, then processor 330 supplies the control message characterizing a mute state to coder 335, which then expands the massage in a conventional manner and supplies the result to processor 320 via path 326. As discussed above, encryption processor 320 encrypts the message and supplies the encrypted result to processor 340 for transmission over antenna 325.

Figure 4:
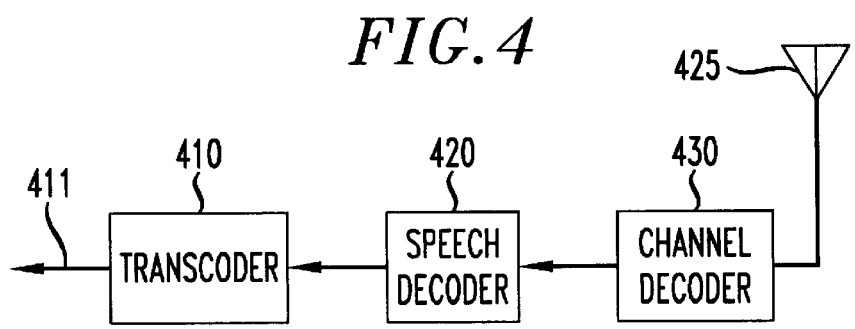
FIG. 4 is a broad block diagram of a receiver section of a wireless base station.

The receiving section of a conventional base station which operates according to the aforementioned IS-136 standard and which receives a message transmitted via antenna 425 is shown in FIG. 4.

Specifically, the receiver section includes, inter alia, antenna 425 connected to channel decoder 430, and also includes speech decoder 420 and transcoder 410. Channel decoder 430, more particularly, assembles a message received via antenna 425 and then decodes the message according to the decoding variables/parameters specified in the message, as is done conventionally. That is, such parameters allow decoder 430 to create a model of the received speech signals and then supply the model to ACELP speech decoder 420 so that the latter decoder can decode the speech signals contained in the message. The resulting decoded/ quantized speech is then supplied to transcoder 410 which "down" codes the speech rate to a predetermined rate, for example, a speech rate down coded from 14 bits to 8 bits. Transcoder 410 then outputs "down coded" result to path 411 connecting to, for example, the public switched network (not shown).

Moreover, if, based on error correction coding contained in a received message, channel decoder 430 concludes that a received message contains a large number of errors, then channel decoder 430 sets a so-called Bad Frame Indicator (BFI), as will be discussed in detail below.

Also, channel decoder 430 uses the aforementioned specially coded word to distinguish speech messages from control messages, as mentioned above. That is, if a message does not contain the code word then its processed as a speech message. If a message is so identified as being a control message, then the message is processed in a conventional manner. In accordance with an aspect of the invention, if a control message indicates that the base station has entered a mute state, then channel decoder 430 sets the aforementioned BFI to a predetermined value, e.g., a value of one, and supplies that value along with a "dummy" speech message to speech decoder 420.

Figure 5:
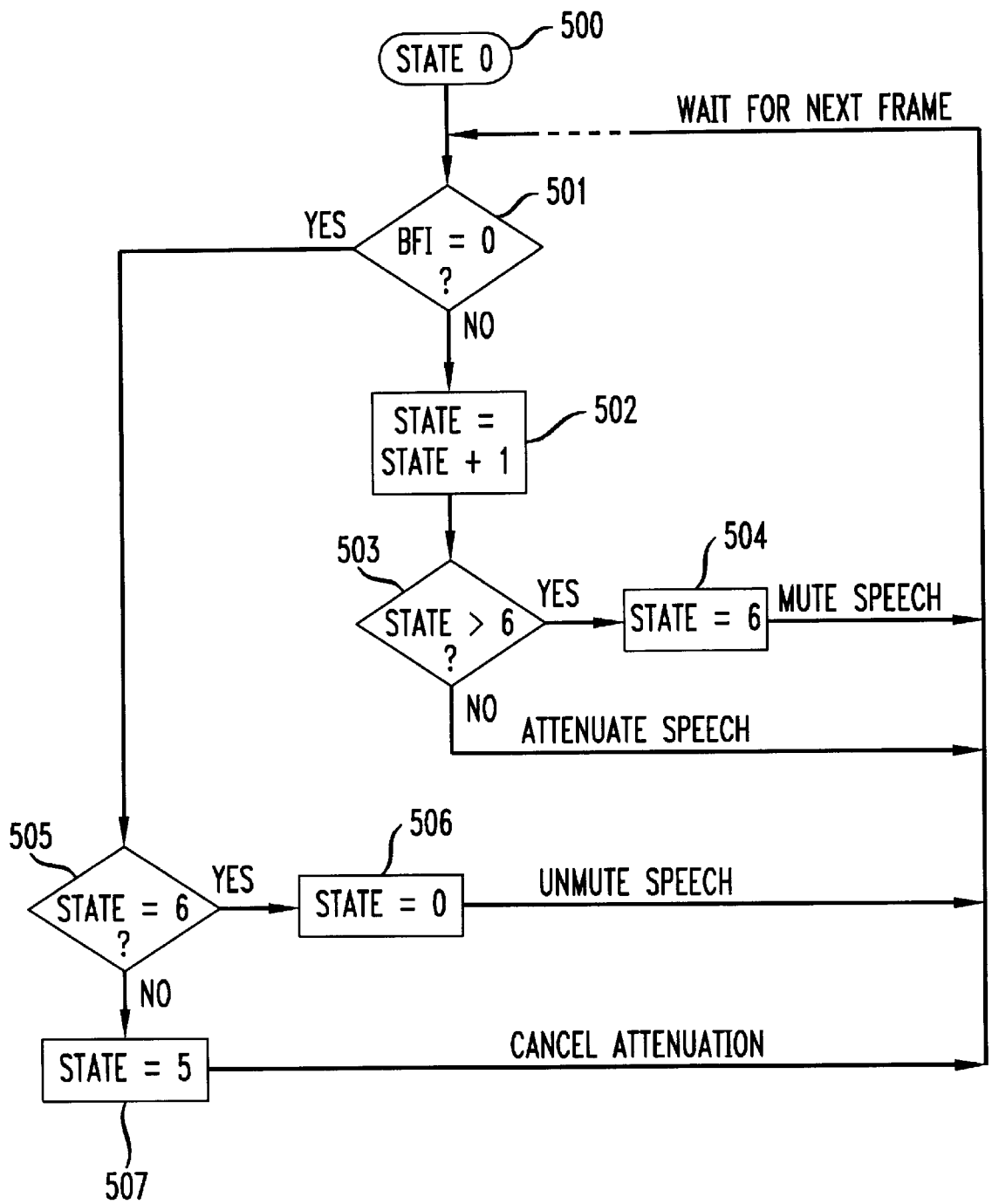
FIG. 5 is a state diagram which controls the operation of the receiver section of FIG. 4 in accordance with the principles of the invention.

FIG. 5 is a state chart illustrating the way in which a processor (not shown) in speech decoder 420 processes a BFI. Specifically, the processor resides in state 0 (block 500), and upon receipt of speech message checks the value of accompanying BFI. If the value of the BFI does not equal 0 (block 501), then the BFI processor increments (block) the value of a variable called STATE by 1. The BFI processor then checks (block 503) to see if the value of STATE is greater than six. If so, then the BFI processor sets the value of STATE to six, which directs speech decoder 420 to output decoded speech characterizing silence to transcoder 410. If the value of STATE does not equal six, then the BFI processor directs speech decoder 420 to output an attenuated version of the decoded speech signals to transcoder 410. If the value of the BFI equals 0, then the BFI processor checks (block 505) to see if the current value of STATE equals six. If it does, then the BFI processor (block 506) sets the value of STATE to zero, which directs speech decoder 420 to "unmute" the speech signals, i.e., to discontinue outputting decoded speech indicative of silence. If the BFI processor (block 505) finds that the value of STATE is not six, then the processor (block 507) sets STATE to five, which directs speech decoder 420 to stop attenuating the decoded speech signals that is has been outputting to transcoder 410. Thus, in accordance with the foregoing, the value of STATE is set to six when a mute control message has been received from a wireless station, thereby causing the base station to output signals characterizing silence for that wireless station, during the time slot(s) assigned to that wireless station.

The foregoing is merely illustrative of the principles of the invention. Those skilled in the art will be able to devise numerous arrangements, which, although not explicitly shown or described herein, nevertheless embody those principles that are within the spirit and scope of the invention. For example, although the invention was discussed in the context of a TDMA wireless system, it can be appreciated that the invention may be readily used in wireless systems that operate in accordance with other standards, for example, the well-known CDMA and GSM standards. Also, the invention may be readily used in other wireless systems, for example, cordless telephone systems, paging systems, announcement systems, etc.

We claim:

1. A wireless station set comprising a microphone, a facility for requesting muting of signals received via the microphone, a transmitter section that generates and transmits a control message over a wireless link in response to a muting request, said control message being operative for causing a base station that receives the control message to output to a transmission facility predetermined signals in place of signals thereafter received from the wireless station.

2. The wireless station set of claim 1 wherein said predetermined signals characterize silence.

3. The wireless station set of claim 1 wherein said predetermined signals characterize one of a plurality of different signals, in which said plurality of different signals include, silence and background noise.

4. The wireless station set of claim 1 wherein said wireless station set and said base station operate according to one of a plurality of different operational standards, in which said plurality of different operational standards include an IS-136, CDMA and GSM standards.

5. The wireless station set of claim 1 wherein said transmission facility extends to a conference connection.

6. A wireless base station comprising an antenna for receiving information from a wireless station, and a receiver connected to the antenna for processing signals received from the wireless station and outputting the processed signals to an output for transmission to an intended recipient, said receiver being operable, responsive to such received signals characterizing a request to enter a muting mode, to substitute predetermined signals for signals thereafter received from the wireless station and output the predetermined signals for transmission to the intended recipient.

7. The wireless base station of claim 5 wherein the intended recipient is a conference connection.

8. The wireless station set of claim 6 wherein said predetermined signals characterize silence.

9. The wireless station set of claim 6 wherein said predetermined signals characterize one of a plurality of different signals, in which said plurality of different signals include, silence and background noise.

10. The wireless station set of claim 6 wherein said wireless station set and said base station operate according to one of a plurality of different operational standards, in which said plurality of different operational standards include an IS-136, CDMA and GSM standards.

11. A wireless communications system comprising at least one wireless station set operative for transmitting voice and control messages over a wireless link, in which such control messages include a request to mute transmission from said wireless station set, and at least one base station operative, responsive to receipt of a muting request from the wireless station set to output to a transmission facility predetermined signals in place of voice messages thereafter received from the wireless station.

12. The wireless communications system of claim 11 wherein the predetermined signals characterize silence.

* * * * *